June 4, 1963   H. D. HUGHES ET AL   3,092,558
PRODUCTION OF ARTICLES OR COATINGS BY ELECTRODEPOSITION
Filed Oct. 14, 1958

METAL FORMER
APPLIED LAYER OF FOIL LOADED WITH MICRONISED AND GRAIN ORIENTED GRAPHITE.

METAL FORMER
ELECTRO-DEPOSITED ARTICLE

METAL ARTICLE AS REMOVED FROM FORMER

Inventors
Herbert Denis Hughes, Richard Walter Lewis
By
Richard Lord agt

United States Patent Office 3,092,558
Patented June 4, 1963

3,092,558
PRODUCTION OF ARTICLES OR COATINGS BY ELECTRODEPOSITION
Herbert D. Hughes, Banstead, and Richard W. Lewis, Esher, England, assignors to Metachemical Processes Limited
Filed Oct. 14, 1958, Ser. No. 767,199
Claims priority, application Great Britain Oct. 15, 1957
8 Claims. (Cl. 204—4)

The present invention relates to the production of metal articles or coatings and includes the steps of production by which a quantity of metal is produced in layer form, having desirable physical properties, and more especially an unexpectedly high degree of hardness and resistance to damage by external influences of a mechanical character, while preserving a high measure of ductility.

It will be understood therefore that the present invention embraces the production of an electrodeposited coating on a workpiece, but the invention is particularly of value in the production of shields or the like which comprise separate entities adapted to be fitted to a member which requires protection, the manner of production being such that the article produced by electrodeposition is so shaped that it fits accurately to the workpiece even when of non-planar or comparatively complex form.

There are numerous circumstances where a member is liable to damage from mechanical influences, such as erosion or by solid particles, and in the aircraft industry the protection of exposed parts from erosion and like effects due to rain or to dust and stones is a matter of considerable importance and difficulty. For example the leading edges of propeller blades are liable to damage or deterioration from this cause and in this case the problem may be aggravated by the provision of de-icing equipment at the same point. Similar problems are involved in the case of rotors for helicopters and the intakes of jet engines. One important object of the present invention is to provide means for producing shaped shields suitable for protecting such articles or parts and fitting accurately to them.

In its broadest aspect the invention consists in producing electrodeposited metals upon a surface including finely divided and grain-oriented conductive material of a crystalline character having a grain size of the order of 0.1 to 25 microns.

The conductive material employed may be a non-metallic crystalline substance such as graphite. Conveniently graphite is produced in the required grain sizes by the method commonly known as micronising, that is by first grinding the material by mechanical methods to the finest possible grain size and then subjecting the so-ground material to a violent agitating or stirring action, for example by means of an air blast, so as to obtain a finely divided powder having a grain size lying in the range of 0.1 to 25 microns.

In carrying out the production of a separable article or shield a mould or former is coated or covered with a layer of a binder loaded with the conductive material and an electrodeposited layer of one or more metals is produced thereon to form a metallic covering or article, the physical properties of which depends on the grain size and orientation of the particles of conductive material. The layer of material coated or applied to the mould or former is preferably subjected to an operation controlling the grain orientation thereof before the metal coating is formed thereon.

While it is known that the nature of deposits produced by electrodeposition methods is to some extent dependent upon the grain size of the surface on which the deposit is formed, it has been unexpectedly discovered that by utilising graphite of extremely fine grain size of the order specified in a layer or foil-forming bonding agent or support it is possible to produce surface coatings of great hardness and that the grain orientation of the graphite has a substantial influence on the hardness of the coatings produced.

Conveniently a thin foil comprising a thermoplastic binder and micronised graphite is applied to a mould or former representing the shape of the finished article required and is smoothed into contact therewith, the assembly being then subject to one or more electrodeposition treatments to form a metal layer of required thickness, the metal article so formed being removed from the mould or former.

Alternatively a layer comprising a thermoplastic binder and micronised graphite is applied in fluid form to a mould or former and then subjected to a treatment to modify the grain orientation, such as by the application of pressure or by smoothing or polishing, the assembly being then subject to one or more electrodeposition treatments to form a metal layer of required thickness.

A mould or former is first produced corresponding to the desired shape for the finished article, being formed from a relatively highly conductive metal. It is then coated with a layer or with a piece of foil containing a thermoplastic binder and micronised graphite of grain size 0.1 to 25 microns, said layer or said foil being subjected to a grain orienting treatment (if not already of suitable grain orientation, for example because the foil was produced by treatments involving rolling thereof), at least one layer of metal, such as nickel, is applied by electrodeposition, and the metal article removed as a self-supporting article, residues of the coated layer or foil being removed if necessary before application to a final support, for example by means of a suitable adhesive.

The present invention thus embraces a separate protective sheath shaped to fit accurately to a component, such as a blade edge for airscrews, consisting of a thin shell of electrodeposited metal the physical properties of which are related to the grain size and orientation of the surface on which the metal is deposited, said surface consisting of a thermoplastic binder and micronised graphite of grain size 0.1 to 25 microns applied to the surface of the mandrel or former.

It has been found convenient in carrying the present invention into effect to utilise micronised graphite since this material can readily be produced at a reasonable cost in the required grain size, but the invention is not specifically limited to the use of this material. As already stated the finely divided or micronised conductive material is incorporated or dispersed in a suitable binder and for this purpose thermoplastic resins or resin compositions can be used, for example a thermoplastic composition containing polyisobutylene.

The mixture of binder and conductive material may be applied in the fluid state to a support surface (either at an elevated temperature or in a solvent) to form a coating or it may be formed into a thin layer or foil. In the former case the support surface may be a surface to be provided with a hard coating or may be a mould or former of relatively highly conductive metal from which the final product is removed, and it may be applied by brushing, spraying, spreading or other equivalent processes. After application it is subjected to a grain orienting treatment by subjecting it to pressure, or by smoothing or polishing. If the conductive material and the binder is utilized in the form of a foil this may be laid upon and smoothed into contact with the surface of an article to be treated or of a mould or former, preferably heated to 60° to 80° C. In this case no separate grain orienting operation will normally be required because the manner of production of foils is such that a normally sufficient degree of grain orientation is inherently obtained. If the finished product calls for an extreme property a grain orientation may be applied as already explained.

A mandrel reproducing a surface to be provided with a hard coating is thus first covered, by any of the methods indicated, with a layer or covering of the thermoplastic material containing the very finely divided conductive material and is then subjected to treatment in an electro-deposition bath of any suitable type to produce a deposit of a desired metal or metals of desired thickness, these operations being performed by methods well-known in the art.

Any metal or metals capable of being deposited by this method may be produced and it has been demonstrated by experience that the metals so deposited are of unexpectedly great hardness, due to the finely divided nature and the favourable grain orientation of the conductive material incorporated in the binder.

In many cases and in accordance with the usual practice in the electro-plating art, an initial undercoating of a different metal may be produced; for example an undercoating of copper may be followed by a coating of other metals.

A particularly valuable application of the present invention is in the production of nickel coatings (sometimes after producing a first thin coat of copper to a thickness of say .0002 to .0003"). A comparatively thick coat of nickel may be applied sufficient to obtain a self-supporting article removable from the mould. In many cases a nickel thickness of .001" and upwards will produce an extremely hard-wearing and erosion-resistant coating having a hardness lying between 400 and 1000 Brinell. Any other metals capable of being electroplated can be deposited in the same way, and it should be noted that organic addition agents need not be present in the bath. If desired a nickel coating may be provided with a surface coating of chromium or any other metal.

Articles produced in this way thus have an extremely hard surface which is highly resistant to mechanical influences, thus in particular it is wear-resistant and resistant to erosion by solid materials, by water, by high temperature gases or by air streams carrying erosive particles.

Where electro-deposited metal coatings are produced on a former the coating so produced forms an article which can be removed from the former. In this case the thermoplastic layer or coating on which the metal is deposited may be removed, for example by means of a solvent, so that the finished article so produced is a shell of hard metal which can be attached to an article to be protected by suitable fixing methods, for example by means of adhesives for metals.

In other cases for example where the hard surface coating is produced on the finished article the layer of thermoplastic binder containing the conductive material may be left in position giving an article having surface characteristics of extreme hardness coupled with a measure of flexibility or yield of the surface such as is favourable in certain applications. In every case not only is the surface produced of extreme hardness but the metal from which the surface is formed is nevertheless ductile and is not liable to develop cracks.

The accompanying drawing illustrates by way of example a protective shield produced according to the invention and applied to the leading edge of an aircraft propeller blade, in which.

Figure 1:
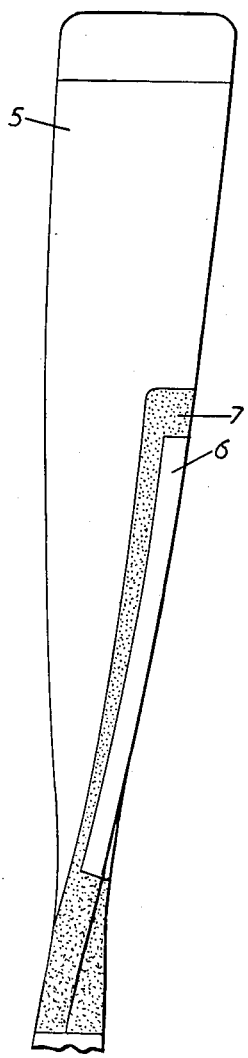
FIG. 1 illustrates the shield fitted in position on the blade.
Figure 2:
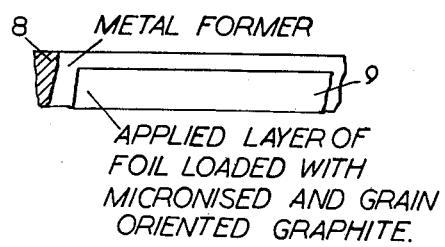
FIGS. 2 to 4 illustrate the production steps in diagrammatic form.
Figure 3:
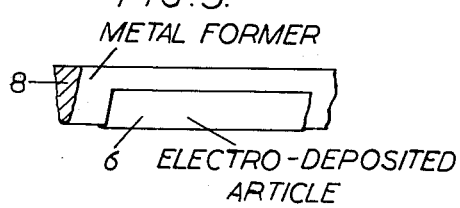
Figure 4:

The blade structure at 5 in FIG. 1 is provided with a shield 6 of electrodeposited nickel covering the major part of the length of the leading edge and overlying the shaded surface 7 housing the de-icing equipment.

The shield 6 is produced on a mould or former 8 which may conveniently consist of a brass casting having a high surface finish. The shape of the former corresponds to the shape of the blade edge to which the shield 6 is to be fitted.

A piece of foil 9 consisting mainly of polyisobutylene loaded with micronised graphite of grain size within the range of 0.1 to 25 microns, or preferably of the range of 0.1 to 10 microns, and of a grain-oriented character, is applied to mould 8 and smoothed into position. This foil may be about .012" thick, and it and the mould may be first heated to 70 to 80° C. The edges of the foil may be fastened down with a suitable grade of adhesive tape.

It is assumed hereinafter that the article 6 is to be formed mainly of nickel since this metal, produced in the manner described has proved to have the required properties in high measure. In the following production steps the usual intermediate steps of swilling and scouring with, say, pumice powder, have not been included as they represent normal practice. The first plating step is to apply a thin layer of copper by electro-deposition, say .0003" thick, with a normal copper plating bath at a current density of say 10 amp. per sq. ft. After acid cleaning a substantial thickness of nickel is deposited, conveniently at the same current rate or at higher current density. The thickness of the deposit may vary at different points of the article by adopting an appropriate technique, for example the mould may be placed in the plating bath in the position indicated on the drawings to give the greatest thickness at the curved edge and the technique may be modified in well known manner to give a greater thickness at the leading edge of the article rather than at the trailing edge. The thickness may in many cases range from say .004" to .01" or more according to requirements.

The composition of the plating bath is in accordance with known procedures; preferably the baths known as Watts' baths are used at about 50° C. and at pH of 4.5 to 5.5, these baths being based on the use of nickel sulphate, nickel chloride and boric acid, but without any organic addition agents since such additions would tend to reduce ductility of the metal.

On completion of the nickel deposition the shaped article or shield 6 is removed from the mould 8 and the foil removed from the metal if necessary with the assistance of a solvent or other release agent. The metal shield 6 so obtained may then be fixed in position as shown on FIG. 1 by means of a suitable adhesive for fixing metal to a support surface, in this case the de-icing surface part 7.

It is an important advantage of the procedure of the present invention that the article is subjected to an inherent compressive stress such that it tends to curl inwardly rather than outwardly so that the article 6 tends to cling snugly against the surface to which it is to be fitted.

The following is a brief summary of the physical properties of the article 6 when produced mainly from nickel as explained above. The nickel is of the same purity as "electrolytic" nickel. The hardness may vary between 400 and 1000 Brinell according to particular working conditions or the required hardness (this depends mainly on the grain size of the graphite and the degree of grain orientation. The shield 6 showed no sign of water erosion under conditions representing flight at 500 m.p.h. for 35 hours under conditions more severe than tropical rainfall and proved highly resistant to damage under test conditions when subject to dust and stones at impact speeds of 500 m.p.h. The shield shows a high degree of resistance to corrosion and its properties in this respect are similar to those of pure nickel sheet. The flexibility is such that a strip of .010" thickness may be bent round a ¼" rod through 360° without signs of cracking, and on release reverts to its original shape.

What we claim is:

1. A method of producing a shaped article by electrodeposition comprising the steps of rolling a material consisting essentially of a non-conductive thermoplastic binder and of graphite particles of a grain size of 0.1 to 25 microns into a foil; and electrodepositing on said foil a coating of nickel from a nickel plating bath of the Watts type.

2. A method of producing a shaped article by electrodeposition which comprises:
   (a) contiguously covering a face of a conductive mandrel with a foil of non-conductive thermoplastic material loaded with graphite particles and prepared by orienting the graphite particles in the graphite-loaded thermoplastic material in a plane parallel to the surface on which the foil is applied, said graphite particles having a grain size of 0.1 to 25 microns; and
   (b) making the foil-covered mandrel face the cathode in an electroplating bath to deposit metal thereon.

3. A method as set forth in claim 2, wherein said foil is produced from graphite loaded material by rolling, and said graphite particles are grain oriented in the direction assumed by said particles during said rolling.

4. A method as set forth in claim 2, wherein said non-conductive material is polyisobutylene, and said face of said mandrel is at a temperature substantially between 60 and 80 degrees centigrade while being covered by said foil.

5. A method as set forth in claim 2, wherein the metal deposited is nickel.

6. A method as set forth in claim 2, wherein the metal is separated from said foil covered mandrel after deposition.

7. A method of electroforming a shaped nickel article which comprises:
   (a) contiguously covering a face of a conductive mandrel with a foil of polyisobutylene loaded with graphite particles and prepared by rolling graphite-loaded polyisobutylene in a manner to orient the grains of said graphite, said graphite particles having a grain size of 0.1 to 25 microns;
   (b) making the foil-covered mandrel face the cathode in a nickel plating bath until a self-supporting layer of nickel is deposited thereon; and
   (c) separating said self-supporting layer from said foil covered mandrel face.

8. A method as set forth in claim 7 wherein said nickel plating bath is of the Watts type and substantially free from organic addition agents.

References Cited in the file of this patent

UNITED STATES PATENTS

| 859,813 | Hartmann | July 9, 1907 |
| 1,674,941 | Bart | June 26, 1928 |
| 2,776,253 | Scholl | Jan. 1, 1957 |

FOREIGN PATENTS

| 201,567 | Great Britain | Oct. 2, 1924 |

OTHER REFERENCES

"Electroplating," by Field and Weill, published by Pitman (New York), 6th Edition (1951), page 236.